United States Patent [19]
Hiersig et al.

[11] 3,839,922
[45] Oct. 8, 1974

[54] TRANSMISSION GEAR
[75] Inventors: Heinz M. Hiersig, Dusseldorf-Oberkassel; Klaus Hansgen; Gerhard Ridder, both of Witten, all of Germany
[73] Assignee: Mannesmann-Meer Aktiengesellschaft, Ohlerkirchweg, Monchengladbach, Germany
[22] Filed: Mar. 21, 1973
[21] Appl. No.: 343,508

[30] Foreign Application Priority Data
Mar. 28, 1972 Germany.......................... 2215881

[52] U.S. Cl. .................................. 74/410, 74/443
[51] Int. Cl. ..................... F16h 57/00, F16h 55/14
[58] Field of Search.......................... 74/410; 11/443

[56] References Cited
UNITED STATES PATENTS
3,381,548   5/1968   Wolkenstein ................... 74/410 X
3,752,004   8/1973   Hanssen ............................. 74/443

Primary Examiner—Leonard H. Gerin
Attorney, Agent, or Firm—Smyth, Roston & Pavitt

[57] ABSTRACT

Transmission gearing for interpositioning between two shafts, having an annular central gear and peripheral pinion gears, a first sleeve on one of the shafts and a coupling sleeve, constructed to provide a first jaw coupling with the sun gear near one axial end of the coupling sleeve, and further constructed to provide a second jaw coupling with the first sleeve at the other axial end of the coupling sleeve, the jaw couplings permitting relative axial motion, as well as tilting of the central gear. Resilient means act on the central gear for limiting that axial displacement, as well as tilting, but act to obtain equalized load distribution as to transfer of power between the central gear and the planet peripheral pinion gears.

7 Claims, 3 Drawing Figures

3,839,922

TRANSMISSION GEAR

BACKGROUND OF THE INVENTION

The present invention relates to transmission gearing, particularly for drive systems of ships. More particularly, the invention relates to such transmission gearing having a central gear on a drive shaft and cooperating with three peripheral pinion gears. Arrangements of this type, using particularly straight teeth for the central gear, have been known for quite a long time and the invention relates particularly to improvements thereof. From another point of view, the invention relates to a reversing gearing, with coaxial drive and driven shafts, and the particular transmission gearing can be interposed in the coaxial arrangement of an engine shaft and of the propeller shaft in the ship's drive system. The invention, thus, relates also to improvements of gearing systems of that kind.

Ships' drive systems operating in a power range of 10 to 30,000 h.p. and a reduction ratio of about 3.5:1, use transmission gears of the type referred to in the introduction paragraph, because these gears are quite compactly constructed, and manufacturing poses little problems because of relative simplicity of parts and assembly thereof.

Gears with helical teeth have advantage over gears with straight teeth in that for similarly rated power transmission the width of the former can be smaller. Moreover, gears with helical teeth run quieter. However, planetary gears with helical teeth require that not only must steps be taken to equalize load distribution of and for the (usually) three planet gears, but axial thrust must be taken up also.

SUMMARY OF THE INVENTION

It is an object of the present invention to provide for suitable connection and fastening of the central gear on the input shaft of a transmission gear which permits load distribution on plural pinion gears as arranged around the periphery of the central gear and meshing therewith; moreover, as well as axial thrust compensation is to be provided for.

In accordance with the preferred embodiment of the invention, it is suggested to provide form-fitting, positive connection between a central gear and its drive shaft, using a compensating jaw coupling or clutch means between these elments in a manner permitting pendulum motion for self-alignment, but that motion is limited by resilient elements acting on and between the central gear and the shafts, as far as resilient reaction is concerned. The pendulum mount of the central gear in cooperation with the resilient means equalizes the load distribution on the pinion gears of the peripheral pinion gearing as the central gear is being appropriately positioned in each instance, whereby any axial displacement and thrust is taken up by the resilient elements.

In accordance with additional features of the invention, it is suggested to secure a sleeve to and about the drive shaft, and a coupling sleeve is disposed concentric thereto. Jaw clutch means couple the two sleeves to each other, and additional jaw clutch means couple the coupling sleeve to the central wheel or gear, whereby preferably the two jaw clutch means are axially displaced from each other and disposed adjacent opposite axial ends of the coupling sleeve. Resilient element or elements either hold the central wheel to the coupling sleeve, or to annular disks on the shaft, in between which the central wheel is located. The resilient elements or elements permit limited local axial movement between sun wheel or gear and coupling sleeves, but without disengagement of the jaw clutches therebetween.

If the central gear is resiliently coupled to the coupling sleeve, the latter is also resiliently coupled to the sleeve on the shaft. If the sun wheel is located between two disks, resilient elements are provided to both (axial) sides of the central gear and are preferably constructed as hollow but liquid-filled annuli, and particular spacer rings limit axial displacement of the central wheel relative to the said two disks.

As a consequence, the central wheel is capable of limited axial displacement, as well as limited tilting on the drive and input shaft for the planetary system. Thus, the central wheel or central gear is in fact capable of undergoing some pendulum motion on the axis of the shaft, but restricted by the several resilient means.

Another advantageous feature of the invention results from utilization in conjunction with a second transmission gear, wherein two central gears are coaxial, and respective peripheral pinion gears are mounted on common shafts and in pairs. Under such circumstances, it is possible to journal these pinion gear shafts in the casing for the gear system. There is no transmission of axial thrust upon the casing through the several gears for reason of the resilient pendulum mount of the central gear.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION

Figure 1:
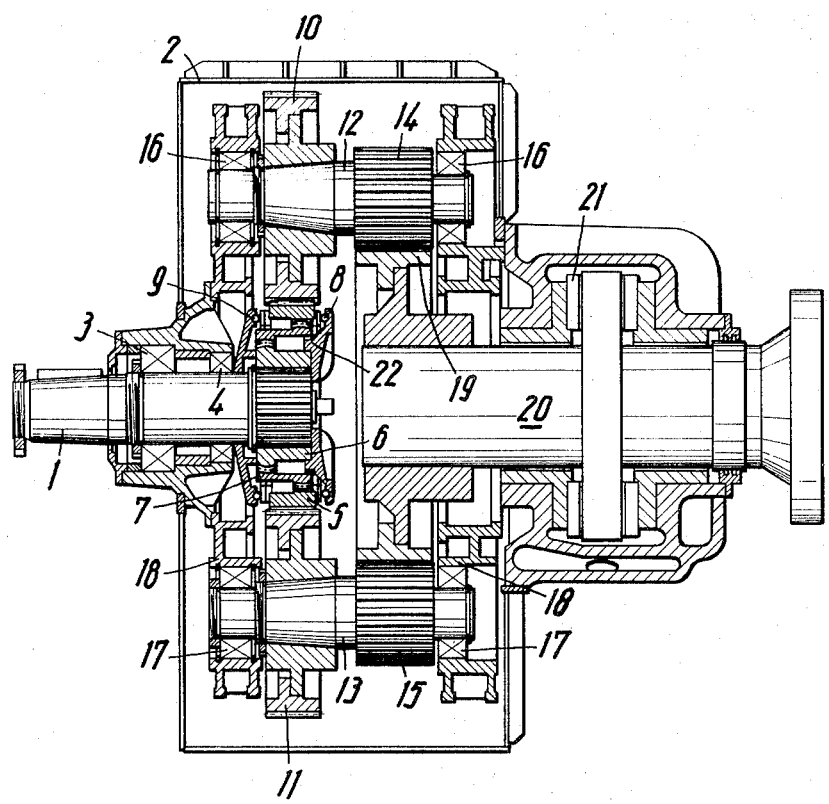
FIG. 1 is a cross-section through a gear impressed in accordance with the preferred embodiment of the invention.

FIG. 1 shows a driving shaft 1 which may be coupled to an engine via an elastic clutch or coupling. Shaft 1 is journalled in a casing 2 by means of axial thrust bearing 3 and a radial bearing 4. An annular central gear 5 is mounted to shaft 1 in a manner more fully described below. Gear or wheel 5 meshes three pinion gears; two of them, 10 and 11, can be seen in FIG. 1.

The central gears 10 and 11 are respectively mounted on shafts 12 and 13, which shafts carry, respectively, additional central gears 14 and 15, and the latter mesh a central gear 19 mounted on output shaft 20 of the system. Shaft 20 can be suitably connected to the propeller shaft. Reference numeral 21 refers to a bearing for shaft 20, suitable for taking up axial thrust as transmitted by the propeller shaft. The shafts 12 and 13 of the several planet gears are journalled in particular inserts 18 by means of bearings 16 and 17. The central gears do not revolve relative to casing 2 about the axis of shaft 1, because inserts 18 are affixed to the casing.

Figure 2:
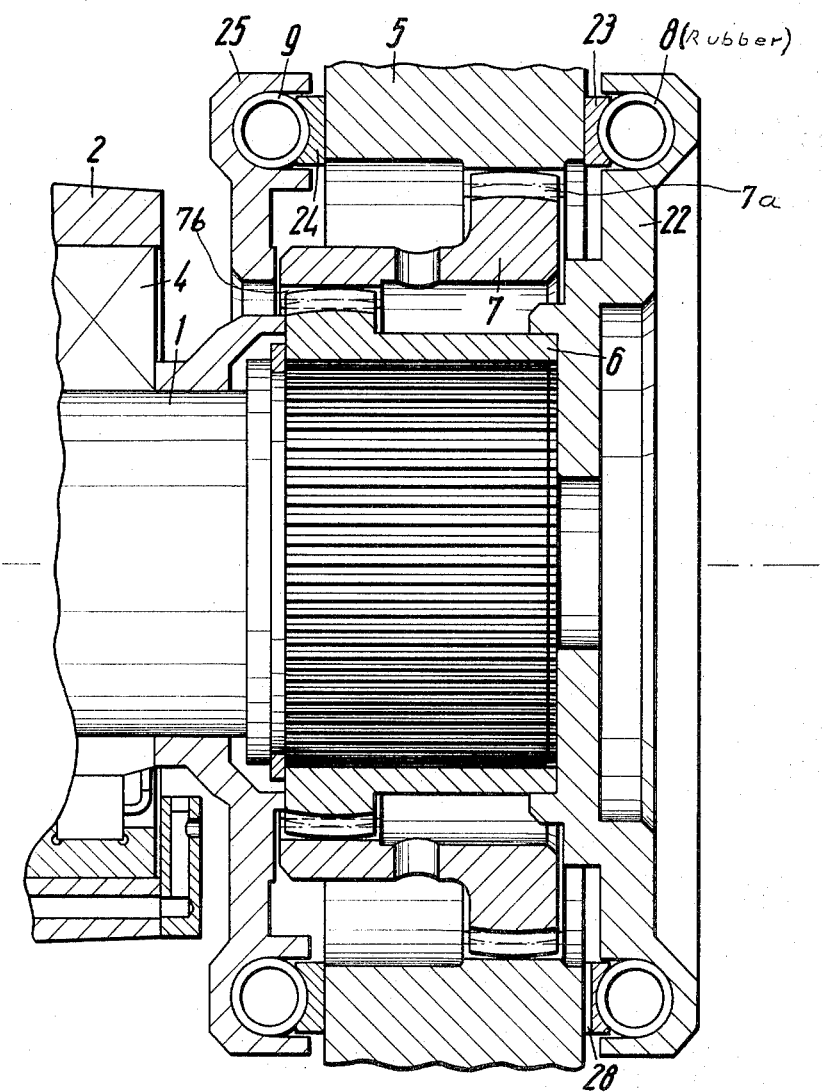
FIG. 2 shows a detail of FIG. 1 in accordance with a first example.

FIG. 2 shows details of the preferred mode of mounting central wheel 5 on shaft 1. Positioning rings or disk-shaped annuli 22 and 25, are disposed to both sides of the central gear, but leaving some play for axial displacement of the latter. These disks 22 and 25 are secured to shaft 1 and thus rotate therewith, while establishing a certain axial space with clearance for the wheel 5. Annular disk 22, for example, is bolted to shaft 1.

A jaw coupling arrangement between elements 1 and 5 couples the former to the latter. The jaw coupling includes a substantially cylindrical coupling sleeve 7, which in the drawing is disposed between the hollow interior of annular central wheel 5, and a sleeve 6, which in turn is secured to shaft 1. One (axial) end of sleeve 7 is provided, for a limited axial section, with radially outwardly extending toothing 7a. As can be seen from the drawings, the teeth of gear clutch part 7a are curved so as to have actually bulging appearance. This configuration permits some rolling motion about any axis transverse to the axis of shaft 1.

The other axial end of sleeve 7 has inwardly directed gear-like toothing 7b. Curved periphery of the jaw teeth on sleeve 6 permit tilting of coupling 7 relative to sleeve 6. Toothing or gearing 7a meshes with a corresponding gearing inside of sun wheel 5, while toothing or gearing 7b meshes an outer gearing on sleeve 6, to provide inner and outer jaw coupling as between the sleeve 7 on one hand and the two elements 5 and 6 on the other hand.

Sleeve 6 is connected to shaft 1 via a jaw coupling and in form-fitting positive relation to obtain transmission of power (torque), as between shaft 1 and sleeve 6. Teeth in sleeve 6 and on shaft 1 provide for positive engagement, and the sleeve is secured against axial displacement. On the other hand, coupling sleeve 7 provides for a pendulum coupling of central gear 5 to shaft 1 (i.e. sleeve 6) permitting some tilting, as well as axial displacement of the former relative to the latter. In order to limit these compensatory displacements, the following provisions are made.

The two disks 22, 25 each have an axial facing side, respectively facing the sun gear in opposite directions. These faces each are provided with an annular groove, respectively receiving resilient, hollow annular elements 8 and 9. The hollow spaces of annuli 8 and 9 are, for example, made of rubber and the toroidal space is filled with a liquid. A washer or spacer ring 23 is interposed between central gear 5 and annular resilient element 8, while a similar ring 24 is interposed between elements 5 and 9. Each of these rings 23, 24 actually reaches into the said grooves and is maintained in position in that manner.

As can be seen from the illustration, the closest distance between elements 22 and 25 on one hand, and element 5 on either side thereof on the other hand, is smaller than the largest axial dimension of each ring 23, 24, while the largest dimension is found along inner and outer peripheries. As a consequence, resilient toroids 8 and 9 are maintained in their respective grooves.

Spacer ring 23 at the righ-hand side of FIG. 2 has a groove 28 for lubricating any sliding contact surfaces as between ring 23 and gear 5. It should be noted that elements 22, 25 and 5 should and normally will rotate in unison, but some relative motion between these parts may occur, even though in narrow limits. Nevertheless, lubrication of the several engaging surfaces is in order.

The construction of FIG. 2 permits change in direction of rotation of the central gear 5, and either resilient element 8 or element 9 has to take up any axial thrust that may be imparted upon the sun gear. The particular construction of elements 8 and 9 permits only quite limited axial displacement of central gear 5, within the confines as defined by the axial spacing between disks 22 and 25. Therefore, jaw clutches or couplings 7a and 7b will not disengage. On the other hand, any tendency by the gear 5 to assume an oblique position displaces liquid in the annuli 8 and 9, and an opposing force is immediately set up tending to straighten the central gear. Thus, the sun gear is mounted in self-aligning configuration.

Figure 3:
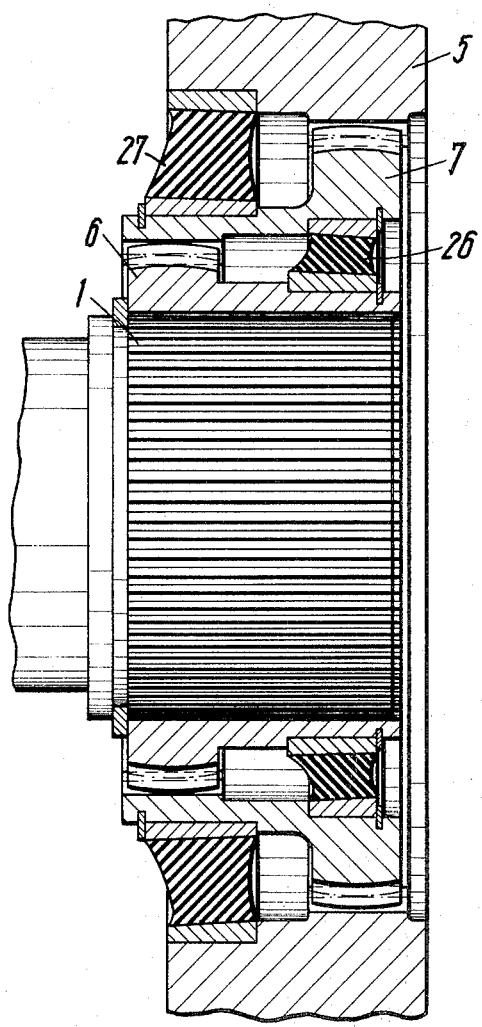
FIG. 3 shows a modification of such detail in accordance with a second example.

The example of FIG. 3 obviates the need for the disks 22 and 25, and provides for resilient reaction locally as between elements 5-7-6. The figure shows an elastic element or elements 26 for coupling sleeve 6 to sleeve 7, while an outer elastic element or elements 27 couple sleeve 7 to central gear 5. These elastic coupling elements permit limited axial displacement as between elements 5-7-6, as well as limited tilting of the central gear, with immediate restoration of the proper position.

Turning back now again to FIG. 1, one can see that all parts are either secured to or journalled in or on casing 2, except for central gear 5, the position of which is controlled by the particular position of resilient elements, such as 8, 9 (FIG. 2) or 26, 27 (FIG. 3). As a consequence, a transmission gear has been established in which radial, as well as axial components (the latter resulting from helical teeth), are used to provide compensating motion for obtaining equal local distribution on the peripheral pinion gears.

The invention is not limited to the embodiments described above, but all changes and modifications thereof not constituting departures from the spirit and scope of the invention are intended to be included.

We claim:

1. Planetary transmission gearing for interpositioning between a first shaft and a second shaft, comprising:
    an annular central gear;
    pinion gears disposed about the periphery of the central wheel and being driven therefrom;
    compensating jaw clutch means for coupling the annular central wheel concentric to the first shaft, permitting relative axial displacement without losing engagement;
    resilient means acting on the central gear for limiting axial displacement, as well as tilting of the central gear relative to the axis of the first shaft and to obtain equalized load distribution as to transfer of power between the central gear and the pinion gears; and
    means for drivingly coupling the pinion gears to the second shaft.

2. Gearing as in claim 1, the gear cluth means including a first sleeve coupled to the first shaft and positively rotating therewith in fixed relative position;
    a coupling sleeve, constructed to provide a first jaw coupling with the central gear near one axial end of the sleeve, and further constructed to provide a second jaw coupling with the first sleeve at the other axial end of the coupling sleeve; and the first and second jaw coupling permitting relative axial motion as between the coupling sleeve, the first sleeve and the central gear, as well as tilting of the latter.

3. Gearing as in claim 2, the resilient means including first resilient means interposed between the central gear and the coupling sleeve at the other axial end thereof, and second resilient means interposed between the first sleeve and the coupling sleeve at the one axial end thereof.

4. Gearing as in claim 1, including a first and a second annular disk secured to the first shaft, the central gear being disposed between the said disks, the resilient means being a pair of resilient annuli, the said disks provided with annular grooves for respectively receiving the annuli, the annuli engaging the sun gear from axially opposite sides.

5. Gearing as in claim 4, the resilient annuli being hollow toroids and filled with liquid.

6. Gearing as in claim 4, there being spacer rings on the sun gear engaging the resilient annuli and holding them in said grooves.

7. Gearing as in claim 1, and included in a casing and wherein the last means includes another planetary gear having a central gear on the second shaft and pinion gears respectively on common shafts with said first mentioned pinion gears, said common shafts being journalled in said casing and not revolving in said casing about said shafts.

* * * * *